US012647954B2

(12) United States Patent
Fu

(10) Patent No.: US 12,647,954 B2
(45) Date of Patent: Jun. 2, 2026

(54) METHOD AND APPARATUS FOR RECEIVING DOWNLINK CONTROL INFORMATION, DEVICE AND STORAGE MEDIUM

(71) Applicant: Beijing Xiaomi Mobile Software Co., Ltd., Beijing (CN)

(72) Inventor: Ting Fu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 380 days.

(21) Appl. No.: 18/276,315

(22) PCT Filed: Feb. 9, 2021

(86) PCT No.: PCT/CN2021/076310
§ 371 (c)(1),
(2) Date: Aug. 8, 2023

(87) PCT Pub. No.: WO2022/170499
PCT Pub. Date: Aug. 18, 2022

(65) Prior Publication Data
US 2024/0129905 A1     Apr. 18, 2024

(51) Int. Cl.
| | |
|---|---|
| *H04W 72/04* | (2023.01) |
| *H04W 48/12* | (2009.01) |
| *H04W 72/0446* | (2023.01) |
| *H04W 72/232* | (2023.01) |

(52) U.S. Cl.
CPC ....... *H04W 72/0446* (2013.01); *H04W 48/12* (2013.01); *H04W 72/232* (2023.01)

(58) Field of Classification Search
CPC ......... H04W 72/1263; H04W 72/1278; H04W 72/23; H04W 48/12; H04W 72/0446; H04W 72/232; H04W 52/02; H04W 72/14; H04L 1/1819; H04L 1/1896; H04L 1/181
See application file for complete search history.

(56) References Cited

U.S. PATENT DOCUMENTS

| | | | |
|---|---|---|---|
| 10,589,719 B1 | 3/2020 | Sohn et al. | |
| 2019/0122470 A1 | 4/2019 | Endo et al. | |
| 2020/0053698 A1* | 2/2020 | Chen ................. | H04W 72/1268 |

(Continued)

FOREIGN PATENT DOCUMENTS

| | | | |
|---|---|---|---|
| CN | 103716823 A | 4/2014 | |
| CN | 110351010 A | 10/2019 | |

(Continued)

OTHER PUBLICATIONS

Extended European Search Report dated Feb. 6, 2025 for European Patent Application No. 22899787.0.

*Primary Examiner* — Wei Zhao
(74) *Attorney, Agent, or Firm* — Volpe Koenig

(57) ABSTRACT

A method for receiving downlink control information, includes: determining a slot corresponding to physical downlink control channel (PDCCH) overbooking in a span, where the span includes more than one slot; performing blind monitoring on a slot previous to the slot corresponding to the PDCCH overbooking in the span, performing blind monitoring on the slot corresponding to the PDCCH overbooking in the span, and prohibiting performing blind monitoring on a slot behind to the slot corresponding to the PDCCH overbooking in the span.

18 Claims, 2 Drawing Sheets

Determine a slot corresponding to PDCCH overbooking in a span, where the span includes more than one slot    S11

Perform blind monitoring on a slot previous to the slot corresponding to the PDCCH overbooking in the span, perform blind monitoring on the slot corresponding to the PDCCH overbooking in the span, and prohibit performing blind monitoring on a slot behind to the slot corresponding to the PDCCH overbooking in the span    S12

(56) References Cited

U.S. PATENT DOCUMENTS

| | | | |
|---|---|---|---|
| 2020/0169991 | A1 | 5/2020 | Lin et al. |
| 2020/0351681 | A1 | 11/2020 | Salah et al. |
| 2020/0404669 | A1 | 12/2020 | Seo et al. |
| 2021/0037607 | A1 | 2/2021 | Hamidi-Sepehr et al. |
| 2021/0232704 | A1 | 7/2021 | Lim et al. |
| 2022/0053522 | A1* | 2/2022 | MolavianJazi ... H04W 72/0453 |
| 2023/0354369 | A1* | 11/2023 | Li ......................... H04L 5/0082 |

FOREIGN PATENT DOCUMENTS

| | | | |
|---|---|---|---|
| CN | 110945822 | A | 3/2020 |
| CN | 111769917 | A | 10/2020 |
| CN | 112153743 | A | 12/2020 |

* cited by examiner

METHOD AND APPARATUS FOR RECEIVING DOWNLINK CONTROL INFORMATION, DEVICE AND STORAGE MEDIUM

CROSS REFERENCE TO RELATED APPLICATION

The present application is a U.S. National Stage of International Application No. PCT/CN2021/076310, filed on Feb. 9, 2021, the entire contents of which are incorporated herein by reference for all purposes.

BACKGROUND

In a new radio (NR) protocol, downlink data are carried on a physical downlink shared channel (PDSCH), and uplink data are carried on a physical uplink shared channel (PUSCH). A base station schedules the PDSCH and the PUSCH through downlink control information (DCI) carried on a physical downlink control channel (PDCCH).

SUMMARY

According to a first aspect, a method for receiving downlink control information is provided and includes: determining a slot corresponding to PDCCH overbooking in a span, where the span includes more than one slot; and performing blind monitoring on a slot previous to the slot corresponding to the PDCCH overbooking in the span, performing blind monitoring on the slot corresponding to the PDCCH overbooking in the span, and prohibiting performing blind monitoring on a slot behind to the slot corresponding to the PDCCH overbooking in the span.

According to a second aspect, a user equipment is provided and includes: a processor; and a memory configured to store a processor-executable instruction. The processor being configured to execute the executable instruction in the memory to implement the steps of the method for receiving the downlink control information.

According to a third aspect, a non-transitory computer-readable storage medium is provided, storing an executable instruction, the executable instruction, when executed by a processor, implements the steps of the method for receiving the downlink control information.

BRIEF DESCRIPTION OF THE DRAWINGS

Accompanying drawings illustrated here are configured to provide further understanding of examples of the disclosure, and constitute a part of the present application, instances of the examples of the disclosure and illustration are configured to illustrate the examples of the disclosure, and do not constitute an improper limitation to the examples of the disclosure.

The accompanying drawings here, which are incorporated in and constitute a part of the specification, illustrate examples consistent with the examples of the disclosure and, together with the specification, serve to explain principles of the examples of the disclosure.

DETAILED DESCRIPTION

Figure 1:
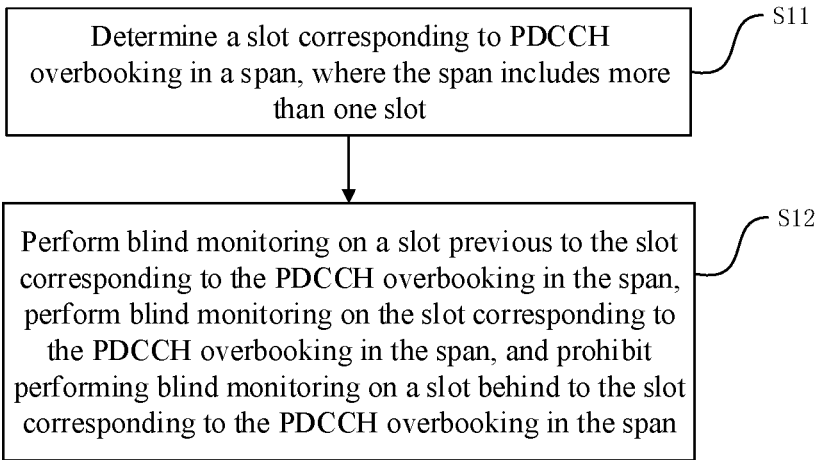
FIG. 1 is a flowchart of a method for receiving downlink control information shown according to an example.

The disclosure relates to the technical field of wireless communication, in particular to a method and apparatus for receiving downlink control information, equipment and a storage medium.

The examples of the disclosure are further explained with reference to the accompanying drawings and specific implementations.

Examples will be explained in detail here, which are represented in the accompanying drawings. Unless otherwise indicated, when the following description refers to the accompanying drawings, the same number in the different accompanying drawings represents the same or similar element. Implementations described in the following examples do not represent all implementations consistent with the examples of the disclosure. Rather, they are merely examples of an apparatus and a method consistent with some aspects of the disclosure as detailed in the appended claims.

The physical downlink control channel (PDCCH) includes a common search space (CSS) and a user equipment specific search space (USS). The CSS is configured to carry common control information, multicast control information, etc. for a cell, and may also be configured to carry user equipment (UE) specific control information. The USS is configured to carry UE specific control information.

In an R15 protocol, PDCCH blind monitoring capability is defined in terms of a single slot in a unit of time. Specifically, blind monitoring capability of the UE in each slot is specified according to subcarrier spacing (SCS). The blind monitoring capability of the UE in one slot includes the maximum number of blind monitoring in the slot and the maximum number of non-overlapped control channel element (CCE) in the slot. The definition is suitable for frequencies below 52.6 GHZ, selectable subcarrier bandwidths are 15 KHz, 30 KHz, 60 KHz or 120 KHz, in the case of different subcarrier bandwidths, the specific values corresponding to the duration of a slot are different, for example, the duration of the slot corresponding to the 15 KHz subcarrier bandwidth is 1 ms, the duration of the slot corresponding to the 30 KHz subcarrier bandwidth is 0.5 ms, the duration of the slot corresponding to the 60 KHz subcarrier bandwidth is 0.25 ms, and so on. The larger the subcarrier bandwidth, the shorter the duration of the slot.

Within a high-frequency band (such as a frequency band being about 60 GHz), in order to deal with phase noise, a larger subcarrier bandwidth is usually selected, such as 960 KHz. A larger subcarrier bandwidth corresponds to a smaller duration (the duration is a duration of a slot). In a case that the subcarrier bandwidth is 960 KHz, the corresponding duration of the slot is 1/64 ms. Within this shorter duration, a user equipment cannot perform PDCCH blind monitoring on each slot, thus, a span PDCCH monitoring pattern or a multi-slot span PDCCH monitoring pattern may be introduced, one span or multi-slot span includes more than one slot. USS blind monitoring capability in a user equipment span is defined in a unit of span within the span PDCCH blind monitoring pattern, and the USS blind monitoring capability in the user equipment span is defined in a unit of multi-slot span within the multi-slot span PDCCH blind monitoring pattern.

One span includes a plurality of slots, and in one span, the USS may possibly exist on all the slots, or the USS exists on some slots. In addition, the USS of the same index value may further possibly exist in two slots in one span, or exist in more than two slots in one span.

PDCCH overbooking possibly occurs in one span, and the PDCCH overbooking generally refers to PDCCH overbooking related to the USS, and not with CSS. This is because a base station ensures that the PDCCH overbooking cannot occur in the CSS.

In view of this, examples of the disclosure provide a method and apparatus for receiving downlink control information, a device, and a storage medium.

An example of the disclosure provides a method for receiving downlink control information, and the method is performed by a user equipment. Referring to FIG. 1, FIG. 1 is a flowchart of a method for receiving downlink control information shown according to an example, as shown in FIG. 1, the method includes steps S11 and S12.

In step S11, a slot corresponding to PDCCH overbooking in a span is determined, and the span includes more than one slot.

In step S12, blind monitoring is performed on a slot previous to the slot corresponding to the PDCCH overbooking in the span, blind monitoring is performed on the slot corresponding to the PDCCH overbooking in the span, and blind monitoring is prohibited from being performed on a slot behind to the slot corresponding to the PDCCH overbooking in the span.

In an example, USS blind monitoring capability needed by all USSs on the slot corresponding to the PDCCH overbooking and all the previous slots in the span is greater than or equal to USS blind monitoring capability in a user equipment span.

In an example, the USS blind monitoring capability in the user equipment span includes a difference between the preset blind monitoring capability in the user equipment span and the overhead of blind monitoring of common search space (CSS) in the user equipment span.

In the example of the disclosure, in a case that PDCCH overbooking occurs, user equipment will blindly monitor a USS on a slot which is at a forward position in a span as much as possible, and discard a USS on a slot which is at a backward, or previous, position. This is done so that the user equipment can enter an energy-saving mode as soon as possible after receiving a PDCCH, thus improving the energy-saving capability of the user equipment.

An example of the disclosure provides a method for receiving downlink control information, performed by user equipment. This method includes determining, in response to that a sum of overhead of PDCCH blind monitoring of all USSs on a first M−1 slots in the span is less than USS blind monitoring capability in a user equipment span and a sum of overhead of PDCCH blind monitoring of all USSs on a first M slots in the span is greater than or equal to the USS blind monitoring capability in the user equipment span, an M$^{th}$ slot in the span to be a slot corresponding to PDCCH overbooking, where the span includes more than one slot, M is an integer greater than 1. This method further includes performing blind monitoring on a slot previous to the slot corresponding to the PDCCH overbooking in the span, performing blind monitoring on the slot corresponding to the PDCCH overbooking in the span, and prohibiting performing blind monitoring on a slot behind to the slot corresponding to the PDCCH overbooking in the span.

In an example, the span includes N slots, and M is a value greater than 1 and less than or equal to N.

In an example, the USS blind monitoring capability in the user equipment span includes a difference between the preset blind monitoring capability in the user equipment span and the overhead of blind monitoring of CSS in the user equipment span.

For example, the preset blind monitoring capability in the user equipment span is C0, the USS blind monitoring capability in the user equipment span is C1, the overhead of blind monitoring of CSS in the user equipment span is C2, C1 is a difference between C0 and C2, namely, C1=C0−C2.

In an example, a span includes N slots. N is an integer greater than 1. Numbers of the N slots range from 0 to N−1 in sequence. The span includes N slots (numbers range from 0 to N−1). $USS_M$ represents USS blind monitoring overhead of all USSs on a $slot_M$. C1 represents the USS blind monitoring capability in the user equipment span.

In a case that $USS_0+USS_1+ \ldots +USS_{M-1}<C1$ and $USS_0+USS_1+ \ldots +USS_M>=C1$, it is determined that the $slot_M$ in the span is the slot corresponding to the PDCCH overbooking.

In the example of the disclosure, in a case that PDCCH overbooking occurs, user equipment will blindly monitor a USS on a slot which is at a forward position in a span as much as possible, and discard a USS on a slot which is at a backward position. Thus, the user equipment can enter an energy-saving mode as soon as possible after receiving a PDCCH. Therefore, improving the energy-saving capability of the user equipment.

An example of the disclosure provides a method for receiving downlink control information, performed by user equipment. This method includes determining, in response to that a sum of overhead of PDCCH blind monitoring of all USSs on a first M−1 slots in a span is less than USS blind monitoring capability in a user equipment span and a sum of overhead of PDCCH blind monitoring of all USSs on a first M slots in the span is greater than the USS blind monitoring capability in the user equipment span, an M$^{th}$ slot in the span to be a slot corresponding to PDCCH overbooking, where the span includes more than one slot, M is an integer greater than 1. This method further includes performing blind monitoring on a slot previous to the slot corresponding to the PDCCH overbooking in the span, performing blind monitoring on the slot corresponding to the PDCCH overbooking in the span, and prohibiting performing blind monitoring on a slot behind to the slot corresponding to the PDCCH overbooking in the span.

In an example, performing blind monitoring on the slot previous to the slot corresponding to the PDCCH overbooking in the span includes: performing blind monitoring of all USSs on all the slots previous to the slot corresponding to the PDCCH overbooking in the span.

In an example, performing blind monitoring on the slot corresponding to the PDCCH overbooking in the span incudes: discarding the set number of USSs on the slot corresponding to the PDCCH overbooking in order of indexes of the USSs from largest to smallest, and performing blind monitoring of the remaining USSs on the slot corresponding to the PDCCH overbooking. A value of the set number is an empirical value, so as to ensure that a sum of overhead of PDCCH blind monitoring of all remaining USSs on a first M slots in the span is less than or equal to the USS blind monitoring capability in the user equipment span after the set number of USSs are discarded.

In an example, a span includes N slots. N is an integer greater than 1. Numbers of the N slots range from 0 to N−1 in sequence. It is assumed that N slots (numbers range from 0 to N−1) are included in a span. $USS_M$ represents USS blind monitoring overhead of all USSs on a slot$_M$. C1 represents the USS blind monitoring capability in the user equipment span.

In a case that $USS_0+USS_1+ \ldots +USS_{M-1}<=C1$ and $USS_0+USS_1+\ldots+USS_M>C1$, it is determined that the slot$_M$ in the span is the slot corresponding to the PDCCH over-booking.

In an example, the set number is 2. The span includes five slots. The sum of overhead of PDCCH blind monitoring of all USSs on the first three slots in the span is less than USS blind monitoring capability in the user equipment span, the sum of overhead of PDCCH blind monitoring of all USSs on the first four slots in the span is greater than the USS blind monitoring capability in the user equipment span. It is determined that the slot corresponding to the PDCCH over-booking is the fourth slot.

Blind monitoring is performed on all USSs on each slot in the first three slots.

On the fourth slot, two USSs on the slot corresponding to the PDCCH overbooking are discarded in order of indexes of the USSs from largest to smallest, and blind monitoring is performed on the remaining USSs on the fourth slot.

Blind monitoring is prohibited from being performed on a slot behind to the fourth slot.

In the example of the disclosure, in response to that the sum of overhead of PDCCH blind monitoring of all USSs on a first M−1 slots in the span is less than the USS blind monitoring capability in the user equipment span and the sum of overhead of PDCCH blind monitoring of all USSs on a first M slots in the span is greater than the USS blind monitoring capability in the user equipment span, in a case that blind monitoring is performed on the slot corresponding to the PDCCH overbooking in the span, the set number of USS on the slot corresponding to the PDCCH overbooking is discarded in order of indexes of the USSs from largest to smallest. Whether the sum of overhead of PDCCH blind monitoring of all remaining USSs on a first M slots in the span is less than or equal to the USS blind monitoring capability in the user equipment span is not needed to be determined in a discarding process. Based on this, the processing efficiency is improved.

An example of the disclosure provides a method for receiving downlink control information, performed by user equipment. This method includes determining, in response to that a sum of overhead of PDCCH blind monitoring of all USSs on a first M−1 slots in a span is less than USS blind monitoring capability in a user equipment span and a sum of overhead of PDCCH blind monitoring of all USSs on a first M slots in the span is greater than the USS blind monitoring capability in the user equipment span, an $M^{th}$ slot in the span to be a slot corresponding to PDCCH overbooking, where the span includes more than one slot, M is an integer greater than 1. This method further includes performing blind monitoring on a slot previous to the slot corresponding to the PDCCH overbooking in the span, performing blind moni-toring on the slot corresponding to the PDCCH overbooking in the span, and prohibiting performing blind monitoring on a slot behind the slot corresponding to the PDCCH over-booking in the span.

In an example, performing blind monitoring on the slot previous to the slot corresponding to the PDCCH overbook-ing in the span includes: performing blind monitoring of all USSs on all the slots previous to the slot corresponding to the PDCCH overbooking in the span.

In an example, performing blind monitoring on the slot corresponding to the PDCCH overbooking in the span incudes: discarding the set number of USS on the slot corresponding to the PDCCH overbooking in sequence in order of indexes of the USSs from largest to smallest, until the sum of overhead of PDCCH blind monitoring of all remaining USSs on a first M slots in the span is less than or equal to the USS blind monitoring capability in the user equipment span.

In an example, a span includes N slots. N is an integer greater than 1. Numbers of the N slots range from 0 to N−1 in sequence. It is assumed that N slots (numbers range from 0 to N−1) are included in a span. $USS_M$ represents USS blind monitoring overhead of all USSs on a slot$_M$. C1 represents the USS blind monitoring capability in the user equipment span.

In a case that $USS_0+USS_1+ \ldots +USS_{M-1}<=C1$ and $USS_0+USS_1+\ldots+USS_M>C1$, it is determined that the slot$_M$ in the span is the slot corresponding to the PDCCH over-booking.

In an example, the span includes five slots. The sum of overhead of PDCCH blind monitoring of all USSs on the first three slots in the span is less than USS blind monitoring capability in the user equipment span, in addition, the sum of overhead of PDCCH blind monitoring of all USSs on the first four slots in the span is greater than the USS blind monitoring capability in the user equipment span, and it is determined that the slot corresponding to the PDCCH over-booking is the fourth slot.

Blind monitoring is performed on all USSs on each slot in the first three slots.

On the fourth slot, the USS on the slot corresponding to the PDCCH overbooking is discarded in sequence in order of indexes of the USSs from largest to smallest, until the sum of overhead of PDCCH blind monitoring of all remaining USSs on the first four slots is less than or equal to the USS blind monitoring capability in the user equipment span. Specifically, the USS with the largest index is preferentially discarded, the USS with the second largest index continues to be discarded, and so on, until the sum of overhead of PDCCH blind monitoring of all remaining USSs on the first four slots is less than or equal to the USS blind monitoring capability in the user equipment span.

Blind monitoring is prohibited from being performed on a slot behind to the fourth slot.

In the example of the disclosure, in response to that the sum of overhead of PDCCH blind monitoring of all USSs on a first M−1 slots in the span is less than the USS blind monitoring capability in the user equipment span, and the sum of overhead of PDCCH blind monitoring of all USSs on a first M slots in the span is greater than the USS blind monitoring capability in the user equipment span, in a case that blind monitoring is performed on the slot corresponding to the PDCCH overbooking in the span, the USS on the slot corresponding to the PDCCH overbooking is discarded in sequence in order of indexes of the USSs from largest to smallest, until the sum of overhead of PDCCH blind moni-toring of all remaining USSs on a first M slots is less than or equal to the USS blind monitoring capability in the user equipment span, after a discarding operation is performed. The needed blind monitoring overhead cannot exceed the USS blind monitoring capability in the user equipment span and the blind monitoring processing stability is ensured.

An example of the disclosure provides a method for receiving downlink control information, performed by user equipment. This method includes determining, in response to that a sum of overhead of PDCCH blind monitoring of all USSs on a first M−1 slots in a span is less than USS blind monitoring capability in a user equipment span and a sum of overhead of PDCCH blind monitoring of all USSs on a first M slots in the span is equal to the USS blind monitoring capability in the user equipment span, an $M^{th}$ slot in the span to be a slot corresponding to PDCCH overbooking, where the span includes more than one slot, M is an integer greater than 1. This method further includes performing blind monitoring on a slot previous to the slot corresponding to the PDCCH overbooking in the span, performing blind monitoring on the slot corresponding to the PDCCH overbooking in the span, and prohibiting performing blind monitoring on a slot behind to the slot corresponding to the PDCCH overbooking in the span.

In an example, performing blind monitoring on the slot previous to the slot corresponding to the PDCCH overbooking in the span includes: performing blind monitoring of all USSs on each slot previous to the slot corresponding to the PDCCH overbooking in the span.

In an example, performing blind monitoring on the slot corresponding to the PDCCH overbooking in the span includes: performing blind monitoring of all the USSs on the slot corresponding to the PDCCH overbooking in the span.

In an example, a span includes N slots. N is an integer greater than 1. Numbers of the N slots range from 0 to $N-1$ in sequence. It is assumed that N slots (numbers range from 0 to $N-1$) are included in a span. $USS_M$ represents USS blind monitoring overhead of all USSs on a $slot_M$. C1 represents the USS blind monitoring capability in the user equipment span.

In a case that $USS_0 + USS_1 + \ldots + USS_{M-1} <= C1$ and $USS_0 + USS_1 + \ldots + USS_M = C1$, it is determined that the $slot_M$ in the span is the slot corresponding to the PDCCH overbooking.

In an example, the span includes five slots. The sum of overhead of PDCCH blind monitoring of all USSs on the first three slots in the span is less than the USS blind monitoring capability in the user equipment span, in addition, the sum of overhead of PDCCH blind monitoring of all USSs on the first four slots in the span is equal to the USS blind monitoring capability in the user equipment span, and it is determined that the slot corresponding to the PDCCH overbooking is the fourth slot.

Blind monitoring is performed on all the USSs on each slot in the first three slots. Blind monitoring is performed on all the USSs on the fourth slot. Blind monitoring is prohibited from being performed on a slot behind to the fourth slot.

An example of the disclosure provides a method for receiving downlink control information, performed by user equipment. This method includes determining a slot corresponding to PDCCH overbooking in a span, where an index value of the slot corresponding to the PDCCH overbooking in the span is a set value, and the span includes more than one slot. This method further includes performing blind monitoring on a slot previous to the slot corresponding to the PDCCH overbooking in the span, performing blind monitoring on the slot corresponding to the PDCCH overbooking in the span, and prohibiting performing blind monitoring on a slot behind to the slot corresponding to the PDCCH overbooking in the span.

The set value is an empirical value, it is ensured that after all the USSs on all the slots behind to the slot corresponding to the PDCCH overbooking are discarded, a sum of overhead of PDCCH blind monitoring of all the USSs on the slot corresponding to the PDCCH overbooking in the span and all the previous slots is less than or equal to the USS blind monitoring capability in a user equipment span.

In an example, the USS blind monitoring capability needed by all the USSs on the slot corresponding to the PDCCH overbooking and all the previous slots in the span is greater than or equal to the USS blind monitoring capability in the user equipment span.

In the example of the disclosure, in a case that it is determined that the PDCCH overbooking is generated in the span, the slot with the index value being the set value in the span is determined to be the slot corresponding to the PDCCH overbooking in the span, and all the USSs on all the slots behind to the slot corresponding to the PDCCH overbooking are discarded. Based on this, the user equipment can enter an energy-saving mode as soon as possible after receiving a PDCCH, thus improving the energy-saving capability of the user equipment.

An example of the disclosure provides a method for receiving downlink control information, performed by user equipment. This method includes determining a slot corresponding to PDCCH overbooking in a span, where a ratio of an index value of the slot corresponding to the PDCCH overbooking in the span to a total number of slots included in the span belongs to a set range, the span includes more than one slot. This method further includes performing blind monitoring on a slot previous to the slot corresponding to the PDCCH overbooking in the span, performing blind monitoring on the slot corresponding to the PDCCH overbooking in the span, and prohibiting performing blind monitoring on a slot behind to the slot corresponding to the PDCCH overbooking in the span.

The set range is an empirical value, it is ensured that after all USSs on all the slots behind to the slot corresponding to the PDCCH overbooking are discarded, a sum of overhead of PDCCH blind monitoring of all the USSs on the slot corresponding to the PDCCH overbooking in the span and all previous slots is less than or equal to USS blind monitoring capability in a user equipment span.

An example of the disclosure provides a method for receiving downlink control information, performed by user equipment. This method includes determining a slot corresponding to PDCCH overbooking in a span, where the span includes more than one slot. This method further includes performing blind monitoring a slot previous to the slot corresponding to the PDCCH overbooking in the span, performing blind monitoring on the slot corresponding to the PDCCH overbooking in the span, and prohibiting performing blind monitoring on a slot behind to the slot corresponding to the PDCCH overbooking in the span.

In the example of the disclosure, USS on the slot corresponding to the PDCCH overbooking and USS on all slots behind to the slot corresponding to the PDCCH overbooking are discarded, blind monitoring is merely performed on each slot previous to the slot corresponding to the PDCCH overbooking. In a case that some blind monitoring effects are lost and the lost blind monitoring effects are tolerable, the energy-saving effect and the processing efficiency are effectively improved.

The technical solutions provided by the examples of the disclosure include the following beneficial effects. In a case that the PDCCH overbooking occurs, the user equipment blindly monitors a USS on a slot which is at a forward position in a span as much as possible, and discard a USS on a slot which is at a backward position, the user equipment will enter an energy-saving mode as soon as possible after receiving a PDCCH. Thus, improving the energy-saving capability of the user equipment.

Figure 2:
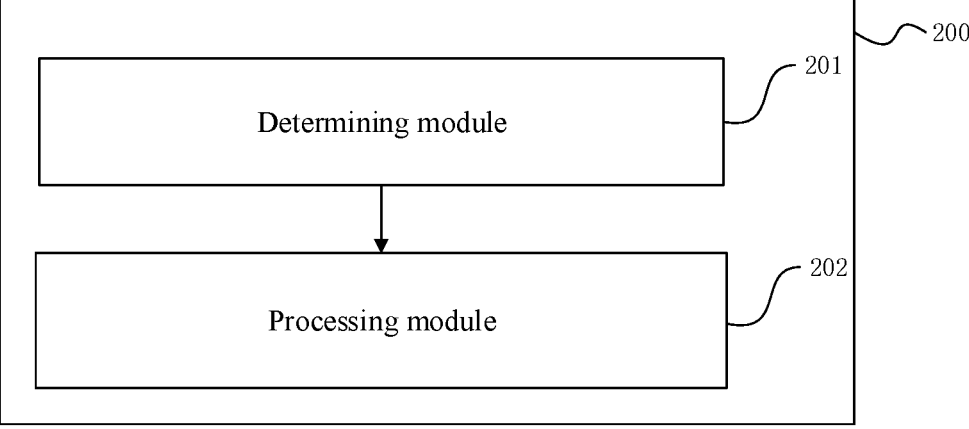
FIG. 2 is a structural diagram of an apparatus for receiving downlink control information shown according to an example.

An example of the disclosure provides an apparatus 200 for receiving downlink control information, performed by a user equipment. Referring to FIG. 2, FIG. 2 is a structural diagram of an apparatus 200 for receiving downlink control information shown according to an example, and as shown in FIG. 2, the apparatus 200 includes a determining module 201 and a processing module 202.

The determining module 201 is configured to determine a slot corresponding to PDCCH overbooking in a span, where the span includes more than one slot.

The processing module 202 is configured to perform blind monitoring on a slot previous to the slot corresponding to the PDCCH overbooking in the span, perform blind monitoring on the slot corresponding to the PDCCH overbooking in the span, and prohibit performing blind monitoring on a slot behind to the slot corresponding to the PDCCH overbooking in the span.

In an example of the disclosure, the determining module 201 is further configured to determine, in response to that a sum of overhead of PDCCH blind monitoring of all user equipment specific search spaces (USSs) on a first M−1 slots in a span is less than USS blind monitoring capability in a user equipment span and a sum of overhead of PDCCH blind monitoring of all USSs on a first M slots in the span is greater than or equal to the USS blind monitoring capability in the user equipment span, an $M^{th}$ slot in the span to be a slot corresponding to PDCCH overbooking, where M is an integer greater than 1. Additionally, in this example, the processing module 202 is further configured to perform blind monitoring on a slot previous to the slot corresponding to the PDCCH overbooking in the span, perform blind monitoring on the slot corresponding to the PDCCH overbooking in the span, and prohibit performing blind monitoring on a slot behind to the slot corresponding to the PDCCH overbooking in the span.

In an example, the USS blind monitoring capability in the user equipment span includes a difference between preset blind monitoring capability in the user equipment span and overhead of blind monitoring of common search space (CSS) in the user equipment span.

In an example of the disclosure, the determining module 201 is further configured to determine, in response to that a sum of overhead of PDCCH blind monitoring of all user equipment specific search spaces (USSs) on a first M−1 slots in a span is less than USS blind monitoring capability in a user equipment span and a sum of overhead of PDCCH blind monitoring of all USSs on a first M slots in the span is greater than the USS blind monitoring capability in the user equipment span, an $M^{th}$ slot in the span to be a slot corresponding to PDCCH overbooking, where M is an integer greater than 1.

Additionally, in this example, the processing module 202 is further configured to perform blind monitoring on a slot previous to the slot corresponding to the PDCCH overbooking in the span, discard at least one USS on the slot corresponding to the PDCCH overbooking in order of indexes of the USSs from largest to smallest, perform blind monitoring of the remaining USSs on the slot corresponding to the PDCCH overbooking, and prohibit performing blind monitoring on a slot behind to the slot corresponding to the PDCCH overbooking in the span.

In an example of the disclosure, the determining module 201 is further configured to determine, in response to that a sum of overhead of PDCCH blind monitoring of all user equipment specific search spaces (USSs) on a first M−1 slots in a span is less than USS blind monitoring capability in a user equipment span and a sum of overhead of PDCCH blind monitoring of all USSs on a first M slots in the span is greater than the USS blind monitoring capability in the user equipment span, an $M^{th}$ slot in the span to be a slot corresponding to PDCCH overbooking, where M is an integer greater than 1. Additionally, in this example, the processing module 202 is further configured to perform blind monitoring on a slot previous to the slot corresponding to the PDCCH overbooking in the span, discard the USS on the slot corresponding to the PDCCH overbooking in sequence in order of indexes of the USSs from largest to smallest, until the sum of overhead of PDCCH blind monitoring of all remaining USSs on a first M slots in the span is less than or equal to the USS blind monitoring capability in the user equipment span, perform blind monitoring of the remaining USSs on the slot corresponding to the PDCCH overbooking, and prohibit performing blind monitoring on a slot behind to the slot corresponding to the PDCCH overbooking in the span.

In an example of the disclosure, the determining module 201 is further configured to determine, in response to that a sum of overhead of PDCCH blind monitoring of all user equipment specific search spaces (USSs) on a first M−1 slots in a span is less than USS blind monitoring capability in a user equipment span and a sum of overhead of PDCCH blind monitoring of all USSs on a first M slots in the span is equal to the USS blind monitoring capability in the user equipment span, an $M^{th}$ slot in the span to be a slot corresponding to PDCCH overbooking, where M is an integer greater than 1.

Additionally, in this example, the processing module is further configured to perform blind monitoring on a slot previous to the slot corresponding to the PDCCH overbooking in the span, perform blind monitoring of all the USSs on the slot corresponding to the PDCCH overbooking, and prohibit performing blind monitoring on a slot behind to the slot corresponding to the PDCCH overbooking in the span.

In an example of the disclosure, the determining module 201 is further configured to determine a slot corresponding to PDCCH overbooking in a span, an index value of the slot corresponding to the PDCCH overbooking in the span being a set value, where the span includes more than one slot. Additionally, in this example, the processing module 202 is further configured to perform blind monitoring on a slot previous to the slot corresponding to the PDCCH overbooking in the span, perform blind monitoring on the slot corresponding to the PDCCH overbooking in the span, and prohibit performing blind monitoring on a slot behind to the slot corresponding to the PDCCH overbooking in the span.

In an example of the disclosure, the determining module 201 is further configured to determine a slot corresponding to PDCCH overbooking in a span, where a ratio of an index value of the slot corresponding to the PDCCH overbooking in the span to a total number of the slots included in the span belongs to a set range, and the span includes more than one slot. Additionally, in this example, the processing module 202 is configured to perform blind monitoring on a slot previous to the slot corresponding to the PDCCH overbooking in the span, perform blind monitoring on the slot corresponding to the PDCCH overbooking in the span, and prohibit performing blind monitoring on a slot behind to the slot corresponding to the PDCCH overbooking in the span.

With reference to the above examples, the determining module 201 and the processing module 202 may be able to perform any combination of the examples in conjunction with one another.

Figure 3:
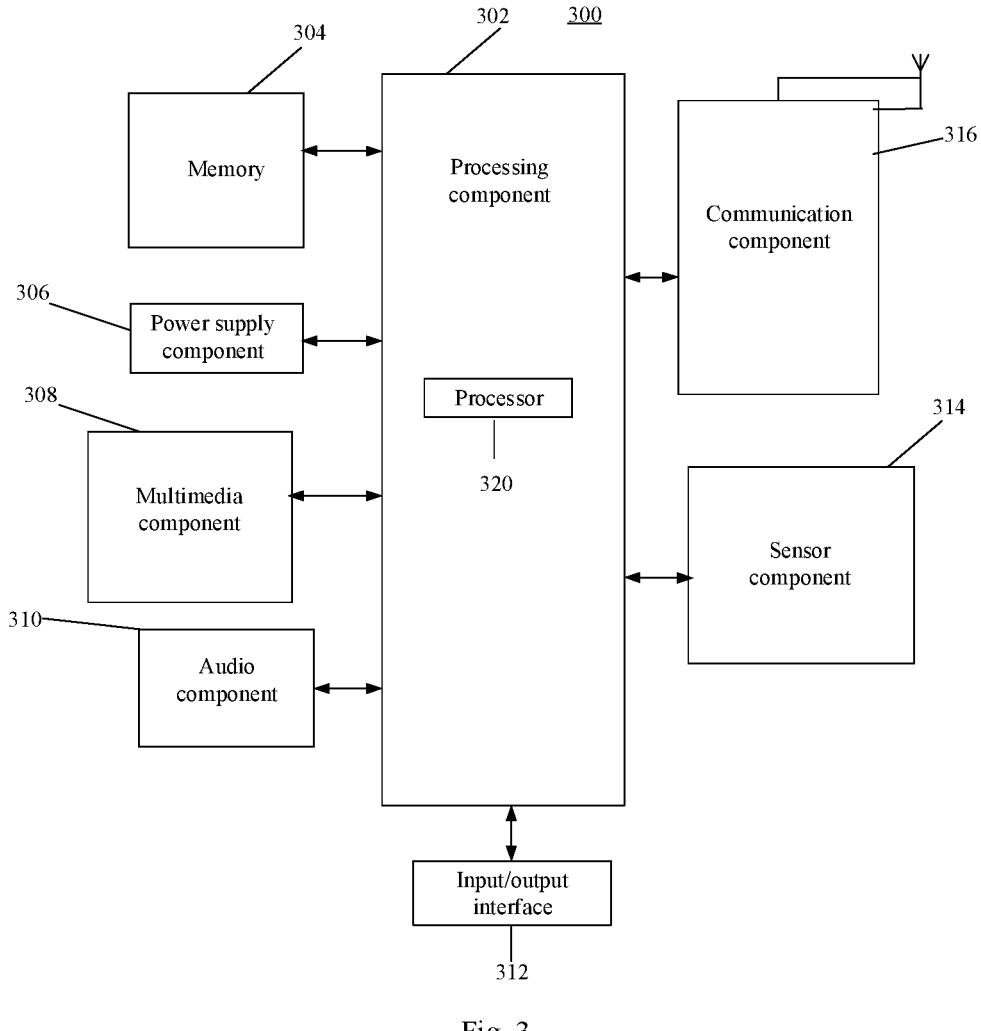
FIG. 3 is a structural diagram of an apparatus for receiving downlink control information shown according to an example.

FIG. 3 is a block diagram of an apparatus 300 for receiving downlink control information shown according to an example. For example, the apparatus 300 may be a mobile phone, a computer, a digital broadcasting terminal, a message transceiving device, a game console, a panel device, a medical device, a fitness device, a personal digital assistant, etc.

Referring to FIG. 3, the apparatus 300 may include the following one or a plurality of components: a processing component 302, a memory 304, a power supply component 306, a multimedia component 308, an audio component 310, an input/output (I/O) interface 312, a sensor component 314, and a communication component 316.

The processing component 302 generally controls an overall operation of the apparatus 300, such as operations associated with display, phone call, data communication, camera operation and record operation. The processing component 302 may include one or a plurality of processors 320 for executing an instruction, so as to complete all or part of the steps of the above methods and examples. In addition, the processing component 302 may include one or a plurality of modules, which facilitates interaction between the processing component 302 and other components. For example, the processing component 302 may include the multimedia component, so as to facilitate interaction between the multimedia component 308 and the processing component 302.

The memory 304 is configured to store various types of data to support the operation on the apparatus 300. Examples of these data include instructions of any application programs or methods operated on the apparatus 300, such as contact data, telephone directory data, messages, pictures, and videos. The memory 304 may be implemented by any type of volatile or nonvolatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or an optical disc.

The power supply component 306 provides electric power for various components of the apparatus 300. The power supply component 306 may include a power management system, one or a plurality of power supplies, and other components associated with generation, management and distribution for the apparatus 300.

The multimedia component 308 includes a screen providing an output interface between the apparatus 300 and a user. In some examples, the screen may include a liquid crystal display (LCD) and a touch panel (TP). In a case that the screen includes the touch panel, the screen may be implemented as a touch screen, so as to receive an input signal from the user. The touch panel includes one or a plurality of touch sensors so as to sense gestures of touching, sliding and touching the panel. The touch sensors may sense boundaries of touching or sliding actions, and may further detect duration time and pressure associated with touch or sliding operations. In some examples, the multimedia component 308 includes a front camera and/or a rear camera. In a case that the apparatus 300 is in an operation pattern, such as a photographing pattern or a video pattern, the front camera and/or the rear camera may receive external multimedia data. Each front camera and the rear camera may be a fixed optical lens system or have focal lengths and optical zoom capability.

The audio component 310 is configured to output and/or input audio signals. For example, the audio component 310 includes a microphone (MIC), and in a case that the apparatus 300 is in an operation pattern, such as a call pattern, a record pattern and a speech recognition pattern, the microphone is configured to receive external audio signals. The received audio signals are further stored in the memory 304 or sent by the communication component 316. In some examples, the audio component 310 further includes a loudspeaker configured to output audio signals.

The I/O interface 312 provides an interface for the processing component 302 and a peripheral interface module, and the above peripheral interface module may be a keyboard, a click wheel, a button, etc. These buttons may include but is not limited to: a homepage button, volume buttons, a start button and a lock button.

The sensor component 314 includes one or a plurality of sensors, configured to provide state evaluation of each aspect for the apparatus 300. For example, the sensor component 314 may detect a turning on/turning off state of the apparatus 300, relative positioning of components, for example, the components are a display and a keypad of the apparatus 300, the sensor component 314 may further detect the apparatus 300 or position changing of one component of the apparatus 300, existence or inexistence of touch of a user and the apparatus 300, and orientation or acceleration/deceleration of the apparatus 300 and temperature changing of the apparatus 300. The sensor component 314 may include a proximity sensor, configured to detect existence of a nearby object without any physical touch. The sensor component 314 may further include an optical sensor, such as a CMOS or a CCD image sensor, used in imaging application. In some examples, the sensor component 314 may further include an acceleration sensor, a gyroscope sensor, a magnetic sensor, a pressure sensor or a temperature sensor.

The communication component 316 is configured to facilitate wired or wireless communication between the apparatus 300 and other devices. The apparatus 300 may access a wireless network based on a communication standard, such as WiFi, 2G or 3G, or their combination. In an example, the communication component 316 receives a broadcasting signal or broadcasting related information from an external broadcasting management system via a broadcasting channel. In an example, the communication component 316 further includes a near-field communication (NFC) module, so as to facilitate short-range communication. For example, the NFC module may be implemented based on a radio frequency identification (RFID) technology, an infrared data association (IrDA) technology, an ultra wide band (UWB) technology, a Bluetooth (BT) technology and other technologies.

In an example, the apparatus 300 may be implemented by one or a plurality of application-specific integrated circuit (ASIC), a digital signal processor (DSP), a digital signal processing device (DSPD), a programmable logic device (PLD), a field-programmable gate array (FPGA), a controller, a microcontroller, a microprocessor or other electronic elements for executing the above methods and examples.

In an example, a non-transitory computer-readable storage medium including an instruction is further provided, such as a memory 304 including an instruction, and the above instruction may be executed by a processor 320 of an apparatus 300 to complete the above methods and examples. For example, the non-transitory computer-readable storage medium may be an ROM, a random access memory (RAM), a CD-ROM, a magnetic tape, a floppy disk and an optical data storage device, etc.

Those skilled in the art will easily figure out other implementation solutions of the examples of the disclosure after considering the specification and practicing the disclosure disclosed here. The present application intends to cover any transformation, purpose or adaptive change of the disclosure which conforms to a general principle of the disclosure and includes common general knowledge or conventional technical means which are not disclosed by the disclosure in the technical field. The specification and the examples are merely regarded as examples, and the true scope and spirit of the disclosure are indicated by the following claims.

It is to be understood that the disclosure is not limited to an accurate structure described above and shown in the accompanying drawings, and various modifications and changes can be made without departing from its scope. The scope of the disclosure is limited merely by appended claims.

Additional non-limiting embodiments of the disclosure include the following.

Embodiment 1. A method for receiving downlink control information, performed by a user equipment, and including: determining a slot corresponding to PDCCH overbooking in a span, where the span includes more than one slot; and performing blind monitoring on a slot previous to the slot corresponding to the PDCCH overbooking in the span, performing blind monitoring on the slot corresponding to the PDCCH overbooking in the span, and prohibiting performing blind monitoring on a slot behind to the slot corresponding to the PDCCH overbooking in the span.

Embodiment 2. The method for receiving the downlink control information according to embodiment 1, where determining the slot corresponding to the PDCCH overbooking in the span includes: determining, in response to that a sum of overhead of PDCCH blind monitoring of all user equipment specific search spaces (USSs) on a first $M-1$ slots in the span is less than USS blind monitoring capability in a user equipment span and a sum of overhead of PDCCH blind monitoring of all USSs on a first M slots in the span is greater than or equal to the USS blind monitoring capability in the user equipment span, an $M^{th}$ slot in the span to be the slot corresponding to the PDCCH overbooking; where M is an integer greater than 1.

Embodiment 3. The method for receiving the downlink control information according to embodiment 2, where the USS blind monitoring capability in the user equipment span includes a difference between the preset blind monitoring capability in the user equipment span and the overhead of the blind monitoring of common search space (CSS) in the user equipment span.

Embodiment 4. The method for receiving the downlink control information according to embodiment 2, where performing blind monitoring on the slot corresponding to the PDCCH overbooking in the span includes: discarding, in response to that the sum of overhead of PDCCH blind monitoring of all USSs on the first M slots in the span is greater than the USS blind monitoring capability in the user equipment span, at least one USS on the slot corresponding to the PDCCH overbooking in order of indexes of the USSs from largest to smallest.

Embodiment 5. The method for receiving the downlink control information according to embodiment 2 or 4, where performing blind monitoring on the slot corresponding to the PDCCH overbooking in the span includes: discarding, in response to that the sum of overhead of PDCCH blind monitoring of all USSs on the first M slots in the span is greater than the USS blind monitoring capability in the user equipment span, the USSs on the slot corresponding to the PDCCH overbooking in order of indexes of the USSs from largest to smallest, until the sum of overhead of PDCCH blind monitoring of all remaining USSs on the first M slots in the span is less than or equal to the USS blind monitoring capability in the user equipment span.

Embodiment 6. The method for receiving the downlink control information according to embodiment 4 or 5, where performing blind monitoring on the slot corresponding to the PDCCH overbooking in the span includes: performing blind monitoring of the remaining USSs on the slot corresponding to the PDCCH overbooking.

Embodiment 7. The method for receiving the downlink control information according to embodiment 1, where performing blind monitoring on the slot corresponding to the PDCCH overbooking in the span includes: performing, in response to that a sum of overhead of PDCCH blind monitoring of all USSs on a first M slots in the span is equal to USS blind monitoring capability in a user equipment span, blind monitoring of all the USSs on the slot corresponding to the PDCCH overbooking.

Embodiment 8. The method for receiving the downlink control information according to embodiment 1, where determining the slot corresponding to the PDCCH overbooking in the span includes: an index value of the slot corresponding to the PDCCH overbooking in the span being a set value.

Embodiment 9. The method for receiving the downlink control information according to embodiment 1, where determining the slot corresponding to the PDCCH overbooking in the span includes: a ratio of an index value of the slot corresponding to the PDCCH overbooking in the span to a total number of the slots comprised in the span belonging to a set range.

Embodiment 10. An apparatus for receiving downlink control information, performed by a user equipment, and including: a determining module, configured to determine a slot corresponding to PDCCH overbooking in a span, where the span includes more than one slot; and a processing module, configured to perform blind monitoring on a slot previous to the slot corresponding to the PDCCH overbooking in the span, perform blind monitoring on the slot corresponding to the PDCCH overbooking in the span, and prohibit performing blind monitoring on a slot behind to the slot corresponding to the PDCCH overbooking in the span.

Embodiment 11. The apparatus for receiving the downlink control information according to embodiment 10, where the processing module is configured to perform blind monitoring on the slot corresponding to the PDCCH overbooking in the span using the following method: determining, in response to that a sum of overhead of PDCCH blind monitoring of all user equipment specific search spaces (USSs) on a first $M-1$ slots in the span is less than USS blind monitoring capability in a user equipment span and a sum of overhead of PDCCH blind monitoring of all USSs on a first M slots in the span is greater than or equal to the USS blind monitoring capability in the user equipment span, an $M^{th}$ slot in the span to be the slot corresponding to the PDCCH overbooking.

Embodiment 12. A user equipment, including: a processor; and a memory configured to store a processor-executable instruction; where the processor is configured to execute the executable instruction in the memory to implement the steps of the method for receiving the downlink control information according to any one of embodiments 1-9.

Embodiment 13. A non-transitory computer-readable storage medium, storing an executable instruction, the executable instruction, when executed by a processor, implementing the steps of the method for receiving the downlink control information according to any one of the embodiments 1-9.

INDUSTRIAL APPLICABILITY

In a case that PDCCH overbooking occurs, user equipment will blindly monitor a USS on a slot which is at a forward position in a span as much as possible, and discard a USS on a slot which is at a backward position. Based on this, the user equipment can enter an energy-saving mode as soon as possible after receiving a PDCCH, thus improving the energy-saving capability of the user equipment.

What is claimed is:

1. A method for receiving downlink control information, performed by user equipment, and comprising:

determining a slot corresponding to physical downlink control channel (PDCCH) overbooking in a span, wherein the span comprises more than one slot; and performing blind monitoring on a slot previous to the slot corresponding to the PDCCH overbooking in the span, performing blind monitoring on the slot corresponding to the PDCCH overbooking in the span, and prohibiting performing blind monitoring on a slot behind to the slot corresponding to the PDCCH overbooking in the span;

wherein determining the slot corresponding to the PDCCH overbooking in the span comprises:

determining that a sum of overhead of PDCCH blind monitoring of all user equipment specific search spaces (USSs) on a first M−1 slots in the span is less than USS blind monitoring capability in a user equipment span, a sum of overhead of PDCCH blind monitoring of all USSs on a first M slots in the span is greater than or equal to the USS blind monitoring capability in the user equipment span;

determining an $M^{th}$ slot in the span to be the slot corresponding to the PDCCH overbooking, and wherein M is an integer greater than 1.

2. The method for receiving the downlink control information according to claim 1, wherein the USS blind monitoring capability in the user equipment span comprises a difference between preset blind monitoring capability in the user equipment span and overhead of blind monitoring of common search space (CSS) in the user equipment span.

3. The method for receiving the downlink control information according to claim 1, wherein performing the blind monitoring on the slot corresponding to the PDCCH overbooking in the span comprises:

determining that the sum of overhead of PDCCH blind monitoring of all USSs on the first M slots in the span is greater than the USS blind monitoring capability in the user equipment span, and discarding the USSs on the slot corresponding to the PDCCH overbooking in order of indexes of the USSs from largest to smallest, until a sum of overhead of PDCCH blind monitoring of all remaining USSs on the first M slots in the span is less than or equal to the USS blind monitoring capability in the user equipment span.

5. The method for receiving the downlink control information according to claim 3, wherein performing the blind monitoring on the slot corresponding to the PDCCH overbooking in the span comprises:

performing blind monitoring of any remaining USSs on the slot corresponding to the PDCCH overbooking.

6. The method for receiving the downlink control information according to claim 1, wherein performing the blind monitoring on the slot corresponding to the PDCCH overbooking in the span comprises:

in a case where the sum of overhead of the PDCCH blind monitoring of all USSs on the first M slots in the span is equal to USS blind monitoring capability in the user equipment span, and performing blind monitoring of all the USSs on the slot corresponding to the PDCCH overbooking.

7. The method for receiving the downlink control information according to claim 1, wherein determining the slot corresponding to the PDCCH overbooking in the span comprises:

an index value of the slot corresponding to the PDCCH overbooking in the span being a set value.

8. The method for receiving the downlink control information according to claim 1, wherein determining the slot corresponding to the PDCCH overbooking in the span comprises:

a ratio of an index value of the slot corresponding to the PDCCH overbooking in the span to a total number of the more than one slot comprised in the span belonging to a set range.

9. A user equipment, comprising:

a processor; and a memory communicatively coupled to the processor and configured to store a processor-executable instruction, wherein the processor is configured to execute the executable instruction to implement a following method for receiving downlink control information:

determining a slot corresponding to physical downlink control channel (PDCCH) overbooking in a span, wherein the span comprises more than one slot; and performing blind monitoring on a slot previous to the slot corresponding to the PDCCH overbooking in the span, performing blind monitoring on the slot corresponding to the PDCCH overbooking in the span, and prohibiting performing blind monitoring on a slot behind to the slot corresponding to the PDCCH overbooking in the span;

wherein the processor is configured to determine the slot corresponding to the PDCCH overbooking in the span by:

determining that a sum of overhead of PDCCH blind monitoring of all user equipment specific search spaces (USSs) on a first M−1 slots in the span is less than USS blind monitoring capability in a user equipment span, a sum of overhead of PDCCH blind monitoring of all USSs on a first M slots in the span is greater than or equal to the USS blind monitoring capability in the user equipment span;

determining an $M^{th}$ slot in the span to be the slot corresponding to the PDCCH overbooking, and wherein M is an integer greater than 1.

10. A non-transitory computer-readable storage medium, storing an executable instruction, the executable instruction, when executed by a processor, implementing a following method for receiving downlink control information:

determining a slot corresponding to physical downlink control channel (PDCCH) overbooking in a span, wherein the span comprises more than one slot; and 4. The method for receiving the downlink control information according to claim 1, wherein performing the blind monitoring on the slot corresponding to the PDCCH overbooking in the span comprises:

determining that the sum of overhead of PDCCH blind monitoring of all USSs on the first M slots in the span is greater than the USS blind monitoring capability in the user equipment span, and discarding at least one USS on the slot corresponding to the PDCCH overbooking in order of indexes of the USSs from largest to smallest.

performing blind monitoring on a slot previous to the slot corresponding to the PDCCH overbooking in the span, performing blind monitoring on the slot corresponding to the PDCCH overbooking in the span, and prohibiting performing blind monitoring on a slot behind to the slot corresponding to the PDCCH overbooking in the span;

wherein determining the slot corresponding to the PDCCH overbooking in the span comprises:

determining that a sum of overhead of PDCCH blind monitoring of all user equipment specific search spaces (USSs) on a first M−1 slots in the span is less than USS blind monitoring capability in a user equipment span, a sum of overhead of PDCCH blind monitoring of all USSs on a first M slots in the span is greater than or equal to the USS blind monitoring capability in the user equipment span;

determining an $M^{th}$ slot in the span to be the slot corresponding to the PDCCH overbooking, and wherein M is an integer greater than 1.

11. The method for receiving the downlink control information according to claim 3, wherein performing the blind monitoring on the slot corresponding to the PDCCH overbooking in the span comprises:

determining that the sum of overhead of PDCCH blind monitoring of all USSs on the first M slots in the span is greater than the USS blind monitoring capability in the user equipment span, and discarding the USSs on the slot corresponding to the PDCCH overbooking in order of indexes of the USSs from largest to smallest, until a sum of overhead of PDCCH blind monitoring of all remaining USSs on the first M slots in the span is less than or equal to the USS blind monitoring capability in the user equipment span.

12. The method for receiving the downlink control information according to claim 4, wherein performing the blind monitoring on the slot corresponding to the PDCCH overbooking in the span comprises:

performing blind monitoring of any remaining USSs on the slot corresponding to the PDCCH overbooking.

13. The user equipment according to claim 9, wherein the USS blind monitoring capability in the user equipment span comprises a difference between preset blind monitoring capability in the user equipment span and overhead of blind monitoring of common search space (CSS) in the user equipment span.

14. The user equipment according to claim 9, wherein processor is configured to perform the blind monitoring on the slot corresponding to the PDCCH overbooking in the span by:

determining that the sum of overhead of PDCCH blind monitoring of all USSs on the first M slots in the span is greater than the USS blind monitoring capability in the user equipment span, and discarding at least one USS on the slot corresponding to the PDCCH overbooking in order of indexes of the USSs from largest to smallest.

15. The user equipment according to claim 9, wherein the processor is configured to perform the blind monitoring on the slot corresponding to the PDCCH overbooking in the span by:

determining that the sum of overhead of PDCCH blind monitoring of all USSs on the first M slots in the span is greater than the USS blind monitoring capability in the user equipment span, and discarding the USSs on the slot corresponding to the PDCCH overbooking in order of indexes of the USSs from largest to smallest, until a sum of overhead of PDCCH blind monitoring of a method for receiving downlink control information, performed by user equipment, and comprising: all remaining USSs on the first M slots in the span is less than or equal to the USS blind monitoring capability in the user equipment span.

16. The user equipment according to claim 14, wherein the processor is configured to perform the blind monitoring on the slot corresponding to the PDCCH overbooking in the span by:

performing blind monitoring of any remaining USSs on the slot corresponding to the PDCCH overbooking.

17. The user equipment according to claim 9, wherein the processor is configured to perform the blind monitoring on the slot corresponding to the PDCCH overbooking in the span by:

in a case where the sum of overhead of the PDCCH blind monitoring of all USSs on the first M slots in the span is equal to USS blind monitoring capability in the user equipment span, and perform blind monitoring of all the USSs on the slot corresponding to the PDCCH overbooking.

18. The user equipment according to claim 9, wherein determining the slot corresponding to the PDCCH overbooking in the span, via the processor, includes an index value of the slot corresponding to the PDCCH overbooking in the span being a set value.

* * * * *